United States Patent [19]

Alderman

[11] Patent Number: 4,948,096

[45] Date of Patent: Aug. 14, 1990

[54] VALVE STEM AND GASKET WITH IMPROVED CLEANING CAPABILITY

[75] Inventor: Darold S. Alderman, Watertown, Wis.

[73] Assignee: AMCA International Corporation, Charlotte, N.C.

[21] Appl. No.: 435,119

[22] Filed: Nov. 13, 1989

[51] Int. Cl.[5] .................. F16K 1/46

[52] U.S. Cl. .................. 251/357; 137/240; 137/315; 277/171

[58] Field of Search .................. 137/240, 315; 251/333, 251/357; 277/168, 170, 171, 172

[56] References Cited

U.S. PATENT DOCUMENTS

| | | | |
|---|---|---|---|
| 481,761 | 8/1892 | Hughes . | |
| 1,009,303 | 11/1911 | Hansen . | |
| 1,175,980 | 3/1916 | Osborne . | |
| 1,250,433 | 12/1917 | Comings . | |
| 2,002,672 | 5/1935 | Melott | 251/127 |
| 2,074,746 | 3/1937 | Hewitt | 251/160 |
| 2,397,269 | 3/1946 | Kelly | 251/159 |
| 2,417,494 | 3/1947 | Hoof | 251/169 |
| 2,482,198 | 9/1949 | Melichar | 251/125 |
| 2,490,511 | 12/1949 | Courtot | 251/144 |
| 2,644,313 | 7/1953 | Griggs | 62/1 |
| 2,789,592 | 4/1957 | Luther | 141/286 |
| 2,851,243 | 9/1958 | Tannock | 251/332 |
| 2,860,266 | 11/1958 | Schrader | 310/112 |
| 2,910,998 | 11/1959 | Davis | 137/375 |
| 2,920,861 | 1/1960 | Hartmann | 251/357 |
| 3,043,554 | 7/1962 | La Garza | 251/175 |
| 3,145,733 | 8/1964 | Shaw et al. | 137/583 |
| 3,209,777 | 10/1965 | Salisbury | 137/315 |
| 3,326,513 | 6/1967 | Hall | 251/86 |
| 3,362,680 | 1/1968 | Weiss | 251/360 |
| 3,445,089 | 5/1969 | Murray | 251/358 |
| 3,454,222 | 7/1969 | Willson | 236/99 |
| 3,503,586 | 3/1970 | Bordes | 251/266 |
| 3,505,888 | 4/1970 | Denkowski | 74/89.15 |
| 3,510,103 | 5/1970 | Carsello | 251/333 |
| 3,511,475 | 5/1970 | Pfau | 251/333 |
| 3,531,086 | 9/1970 | Shannon | 251/356 |
| 3,612,479 | 10/1971 | Smith, Jr. | 251/176 |
| 3,775,832 | 12/1973 | Werra | 29/450 |
| 3,991,973 | 11/1976 | Politz et al. | 251/210 |
| 4,372,467 | 2/1983 | Pritchitt | 222/501 |
| 4,408,745 | 10/1983 | Swiers et al. | 251/357 |
| 4,531,532 | 7/1985 | Zimmerly | 137/15 |

FOREIGN PATENT DOCUMENTS

| | | |
|---|---|---|
| 0140510 | 5/1985 | European Pat. Off. . |
| 2744294 | 4/1979 | Fed. Rep. of Germany . |
| 2225667 | 11/1974 | France . |
| 371933 | 10/1963 | Switzerland . |
| 290373 | 5/1928 | United Kingdom . |

OTHER PUBLICATIONS

Advertising Brochure Entitled, "Flowmaster Sanitary Air-Actuated Valves With New Dynaflow Seat II", 4-15-87.

Article No. 605-02 Entitled, "3-A Accepted Practices for Permanently Installed Sanitary Product-Pipelines and Cleaning Systems", dated 10/25/67.

Article by Cherry-Burrell Entitled, "Automatic Valves and Manifolds", (Undated).

3-page Advertising Brochure by Stainless Products, Inc., Catalog No. SP160RS, 4-15-87.

Two-page Advertising Brochure by TCI Tri-Canada, Inc., Aug. 1983.

*Primary Examiner*—Gerald A. Michalsky

*Attorney, Agent, or Firm*—Fitch, Even, Tabin & Flannery

[57] ABSTRACT

A valve assembly includes a gasket trapped between spaced apart flanges of a valve stem. The gasket is worked over one flange, causing one end of the gasket to deflect with the cross-section undergoing a rolling motion. Upon passing the flange the deflected end of the gasket resumes its normal size, thereby remaining captive between the valve stem flanges. The valve stem flange and the gasket have recesses formed therein for visual inspection of hidden surfaces, useful to evaluate flush cleaning performed on the valve assembly. The gasket internal bore and the valve stem body extending between the flanges have complementary cross-sectional configurations. The gasket has a tapered bore to aid in insertion on the valve stem and the recesses are part conical, terminating at an intermediate point along the gasket bore. The gasket is dimensioned to float in radial and axial directions when mounted on the valve stem.

25 Claims, 5 Drawing Sheets

VALVE STEM AND GASKET WITH IMPROVED CLEANING CAPABILITY

BACKGROUND OF THE INVENTION

The present invention pertains to valve assemblies, and in particular to sanitary valve assemblies used in the food industries and elsewhere, where it is important to periodically clean the valve assembly.

DESCRIPTION OF THE RELATED ART

The present invention is directed to a particular class of valves and valve assemblies up to and including those used in high pressure high flow applications, such as those in the food processing industries where cleanability of equipment is important. The Cherry-Burrell Corporation, assignee of the present invention has provided a valve apparatus having a solid valve stem of corrosion resistant material, one end of which is attached to a valve actuator. A pair of spaced-apart flanges are located at the other end of the valve stem, proximate a free end thereof. A generally cylindrical gasket is received between the flanges, and is installed by pressing the flange closest the free end of the valve stem through the gasket bore.

The gasket has some measure of resilience, being made of PTFE material. However, the Cherry-Burrell gasket must be heated prior to installation, to improve the ability of the gasket to be stretched over the valve stem. The gasket is located on the outer flange of the valve stem, that flange closest the free end, and by pressing or otherwise tapping the valve stem, the gasket is worked past the outer flange. Upon cooling, the gasket returns to its original, smaller size, thus being held in retention between the flanges of the valve stem. While the gasket described above is not as difficult to install as others now in use, improvements can be made to further reduce the difficulty of replacing the gasket in the field, and it is particularly desirable to eliminate the need to heat the gasket prior to working it onto the valve stem.

The spacing between flanges is sufficiently wide to allow the gasket an axial "play" or travel, and the internal bore of the gasket is sufficiently wide so as to allow a radial play about the valve stem. This allows the gasket to "float" when flushed with cleaning solutions. Ease of cleaning requires that the valve components used have a minimum number of crevices in which food products can lodge during valve operation. Any particles accumulated in the valve parts should ideally be easily flushable during cleaning, without requiring disassembly of the valve components. Stated another way, the valve should be able to be cleaned in place. The Cherry-Burrell valves have met with wide acceptance in the food processing industry, where sanitation standards require that the food processing equipment, including the valve assemblies be routinely cleaned on a frequent basis, often several times during the course of a production day.

Other arrangements have been proposed to simplify or otherwise reduce the manual effort required to mount the gasket on a valve stem. Such arrangements have compromised other aspects of the valve assembly design or operation. For example, U.S. Pat. No. 4,531,532 provides a series of cantilever-mounted fingers extending from one annular side of the gasket. The fingers, being separated from one another by slits extending in an axial direction, are made more flexible and are more easily passed over the outer flange of a valve stem.

However, the fingers may trap food particles or other materials therebetween thus making cleaning more difficult. Also, the fingers to weaken, possibly breaking off during subsequent use.

Further, the fingers extend the gasket axial dimensions, increasing the size of the gasket a considerable amount. Also, when the valve is in a closed position, the gasket is pressed against a valve seat. Since it is desirable that the fingers of the gasket not be pressed against the valve seat, a radially-enlarged shoulder is provided for this purpose. However the radial dimensions of the gasket are increased, along with the radial dimensions of the valve stem flange remote from the free end of the valve stem.

Other valve constructions, for example, U.S. Pat. Nos. 1,175,980; 2,482,198; 2,860,266; 3,511,475; 2,910,998, 2,789,592, 4,372,467 and 4,408,745 require more elaborate assembly to mount a resilient gasket on a valve stem or other valve body. With some assemblies, several components must be fastened together using screw fasteners or the like to retain the gasket in position. U.S. Pat. Nos. 2,002,672; 2,397,269 and 3,145,733 disclose resilient gaskets which are stretched over or staked on a valve stem. However, these latter constructions are unsuitable for high pressure, high flow rate applications.

The following U.S. patents disclose gaskets which are snap-fit or otherwise secured to operators such as that disclosed in U.S. Pat. No. 3,505,888 and valve stems without requiring special assembly U.S. Pat. Nos. 481,761; 2,490,511; 2,644,313; 2,851,243; 2,920,861; 3,043,554; 3,209,777; 3,445,089; 3,503,586; 3,531,086; 3,612,479; and 3,991,973.

Several foreign patent documents have been published which describe gaskets readily mounted on valve stems without an elaborate assembly. Included are European Patent Application No. 0,140,510 showing the slip-finger gasket mentioned above with respect to U.S. Pat. No. 4,531,532. French Patent Application No. 2,225,667 describes a generally conical gasket having an enlarged flange at one end trapped between spaced apart flanges of a valve stem, and mounted to avoid axial or radial play. Offenlegungshrifft No. 27,44,294 describes an elaborate collar with upstanding fingers which is snapped onto a valve stem having an enlarged head. British provisional specification No. 290,373 describes a sealing ring of generally square cross-section trapped between spaced-apart flanges of a valve stem. The sealing ring is free to float between the flanges to assist in the seating of the gasket against the valve housing.

As an alternative, gaskets are sometimes mounted in a valve housing, rather than on a valve stem or actuator Examples of this construction include U.S. Pat. Nos. 1,009,303; 2,417,494; 3,326,513; and 3,775,832.

Despite the advances referred to above, several improvements in valve constructions are still being sought today. For example, valve constructions used in the food service industry must be frequently cleaned and it is desirable to provide a visual inspection of internal surfaces of a valve construction, to perform a quality control check on the cleaning procedures employed. As was mentioned above, gaskets which can be mounted to a valve stem without requiring disassembly of the stem have met with wide acceptance in a variety of applications, including the food handling industry. It is desirable to provide a gasket which can "float" to facilitate cleaning of internal gasket and valve stem surfaces by a flow of cleaning fluid. It is preferable however that the gasket and valve stem be free of surface disruptions which could impede flow, gasket seating, or which could trap particles carried in the flow. Further, it is important that such a gasket be economically produced, and be of a minimal, compact size.

SUMMARY OF THE INVENTION

It is an object according to the present invention to provide a valve stem and gasket assembly which can be efficiently cleaned in place by flushing to clean hidden surfaces of the gasket and valve stem with a flow, particularly a turbulent flow of cleaning fluid.

More particularly, it is another object according to the present invention to provide mating valve stem and gasket components which are readily cleaned in place by flushing with both high flow rate and low flow rate turbulent flows of a cleaning solution.

A further object according to the present invention is to provide a mating valve stem and gasket of the above-described type which permits an easy and simple mating of the gasket to the valve stem without requiring the gasket to be heated.

Yet another object according to the present invention is to provide a mating valve stem and gasket of the above-described type which is of a compact size.

These and other objects according to the present invention, which will become apparent from studying the appended description and drawings, are provided in a valve stem and gasket assembly, comprising:

- a valve stem having a body having an inner end for connection to an actuator and an opposed outer, free end;
- a first, smaller flange carried on said body adjacent the outer end and a spaced apart second, larger flange also carried on said body, between said first flange and said body inner end;
- an annular gasket carried on said body, between said first and second flanges, said gasket made of a resilient material and having a central wall defining a central opening so as to be mountable on said valve stem by passing the first flange through the central opening thereof with the gasket thereupon being held captive between said first and second flanges;
- said first flange having an outer periphery contacting said gasket central wall during mounting of said gasket on said valve stem, said outer periphery being shaped with a frustoconical taper or concave or convex curve, so as to converge toward said body outer end;
- said gasket central wall extending between first, outer and second, inner continuous annular faces of said gasket disposed adjacent said first and second flanges when said gasket is mounted on said valve stem;
- said gasket central wall converging toward said outer face, with said outer face abutting said outer flange when said gasket is mounted on said valve stem; and
- said gasket inner and outer faces spaced apart by a distance less than the spacing between said valve stem inner and outer flanges so as to allow movement of said gasket between said inner and outer flanges.

Further objects according to the present invention are attained in a mating valve stem and gasket of the above-described type having at least one recess in the gasket central wall as well as the valve stem outer flange to provide ready visual inspection of internal, "hidden" surfaces of the mating assembly. In one preferred embodiment, two recesses are provided on the valve stem outer flange and four recesses are provided on the gasket central wall. The recesses of the gasket central wall extend only along intermediate portions of the central wall, and not end portions thereof adjacent the seating surfaces of the gasket.

Further objects according to the present invention are attained with a valve stem body portion located between inner and outer flanges, which includes a generally cylindrical inner section adjacent the inner flange, a generally cylindrical section adjacent the outer flange, and an intermediate section therebetween converging toward the outer flange. In a preferred embodiment, the valve stem body between the inner and outer flanges thereof and the gasket central wall have complementary cross-sectional configurations.

BRIEF DESCRIPTION OF THE DRAWINGS

In the drawings, wherein like elements are referenced alike.

DETAILED DESCRIPTION OF THE PREFERRED EMBODIMENTS

Figure 1:
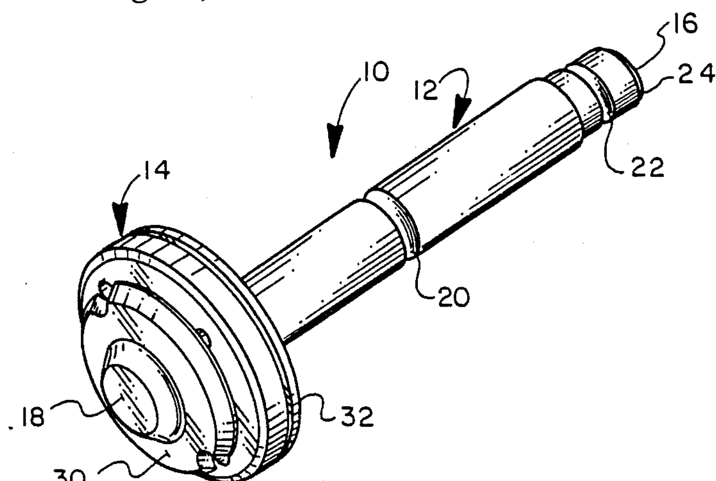
FIG. 1 is a perspective view of a valve assembly illustrating principles according to the present invention.

Referring now to the drawings, and initially to FIG. 1, a valve assembly is generally indicated at 10, and includes a valve stem generally indicated at 12 and a gasket generally indicated at 14. In the preferred embodiment, valve stem 12 has inner, free end 16 and an opposed, outer free end 18. A recess 22 is provided for mounting the valve stem to a linear actuator (such as that illustrated at 202 in FIG. 11) which drives the valve stem in an axial direction with the outer end 18 thereof leading during a valve closing operation. The optional recess 20 provides seating for an O-ring gasket 21 (see FIG. 11). Valve stem 12 further includes a chamfered edge 24 and a recess 22 at the valve stem inner end 16 to provide a quick-connect mounting of the valve stem to the linear actuator 202. If desired, other, conventional means, such as screw threads, may be employed to mount the valve stem to a suitable actuator.

Figure 11:
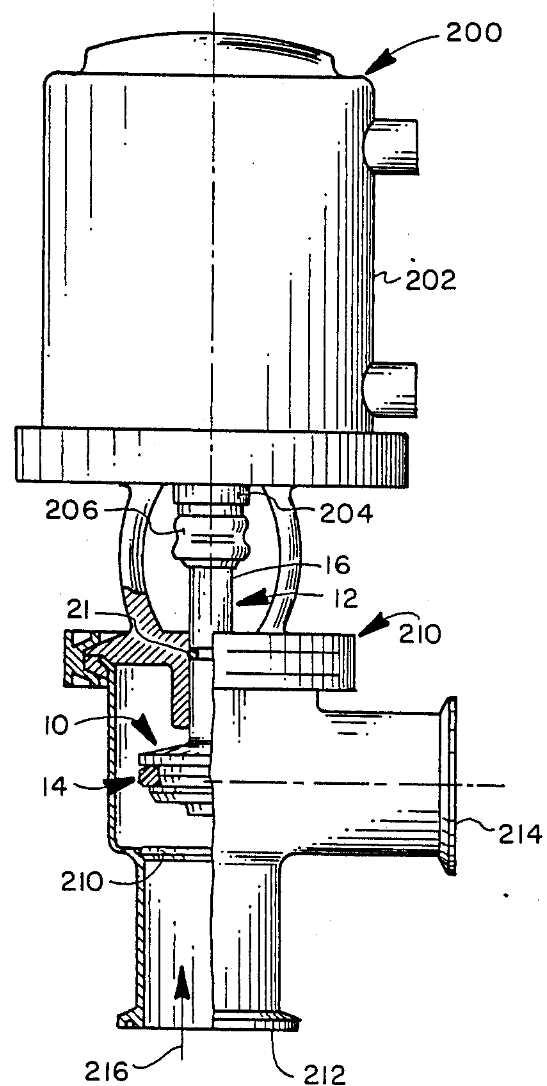
FIG. 11 is a fragmentary elevational view, shown partly broken away, of a valve stem and actuator assembly.

Referring additionally to FIG. 11, the valve stem 12 includes a pair of axially spaced flanges at its "outer" end 18, that end which lies outside of the valve actuator coupling 206 (but inside the valve body 210), when the valve assembly 10 is installed in valve mechanism 200. FIG. 11 shows the valve mechanism 200 including a valve actuator 202 having a driven rod 204 and a releasable coupling 206 engageable with the inner end 16 of the valve stem 12. Mechanism 200 further includes a valve housing generally indicated at 210 having an inlet 212 and an outlet 214. Flow enters valve body 210 in the direction of arrow 216. Valve body 210 also includes a valve seat 220. The valve assembly 10 illustrated in FIG. 11 is employed as a shut-off valve, blocking flow through valve body 210. The valve stem and gasket assembly is shown in a retracted or open position. When actuator 202 is energized, rod 204 is extended, moving gasket 14 into contact with valve seat 220.

Figure 2:
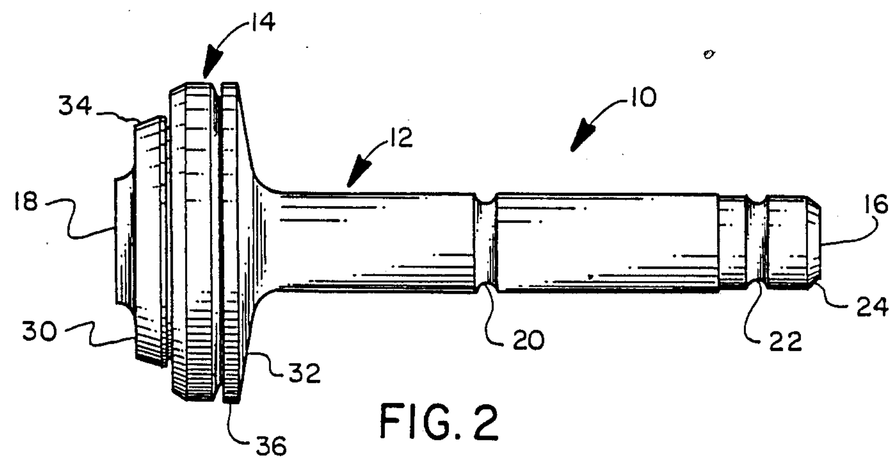
FIG. 2 is a side elevational view of the valve assembly of FIG. 1.
Figure 3:
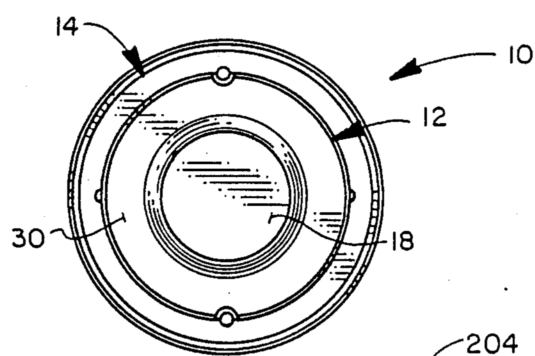
FIG. 3 is an end elevational view of the valve assembly of the preceding figures.

Referring again to the valve stem and gasket assembly, a first, outer flange 30 is located proximate the outer end 18 and a second, inner flange 32 is axially spaced therefrom, being positioned remote from the outer end 18. With reference to FIG. 2, for example, it can be seen that the outer flange 30 has a reduced diameter compared to the inner flange 32. Further differences between the flanges include a converging peripheral edge 34 of the outer flange 30 as opposed to a generally cylindrical peripheral edge 36 of inner flange 32. The edge 34 is preferably made outwardly converging by tapering to assume a frustoconical configuration, but the edge 34 could also be rounded to form a convex surface. According to an important feature of the present invention, the configuration of valve stem surface 34 is made to converge in the same direction as, and is preferably made to complement the central, transition section 66 of the gasket bore wall 56.

The valve stem 12 is preferably formed as a single unitary member using conventional techniques. The valve stem 12 can be used in a variety of applications, and has found particular acceptance in the food processing industry. The preferred material for valve stem 12 is a corrosion resistant alloy which can be easily cleaned and which allow the valve stem to easily meet sanitation standards.

Figure 7:
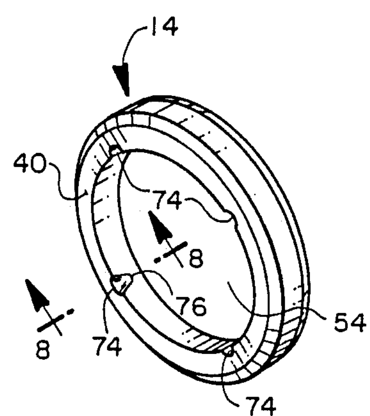
FIG. 7 is a perspective view of a gasket of the assembly of FIGS. 1-3.

The valve stem assembly 10 also includes the gasket 14, which is illustrated in isolation in FIG. 7. The gasket is preferably made of a material less rigid than that of the valve stem. In the preferred embodiment, gasket 14 is made of PTFE. Alternatively, the gasket may be made of any suitable TFE plastic, or of a harder durometer elastomeric material.

Generally speaking, the gasket 14 has a cylindrical configuration with unbroken outer surfaces, and is thereby distinguished for example, from gaskets having finger constructions. The gasket 14 has an outer seating face 46 and an inner seating face 42 (see FIG. 8) both of which are generally annular in their preferred configuration.

Figure 8:
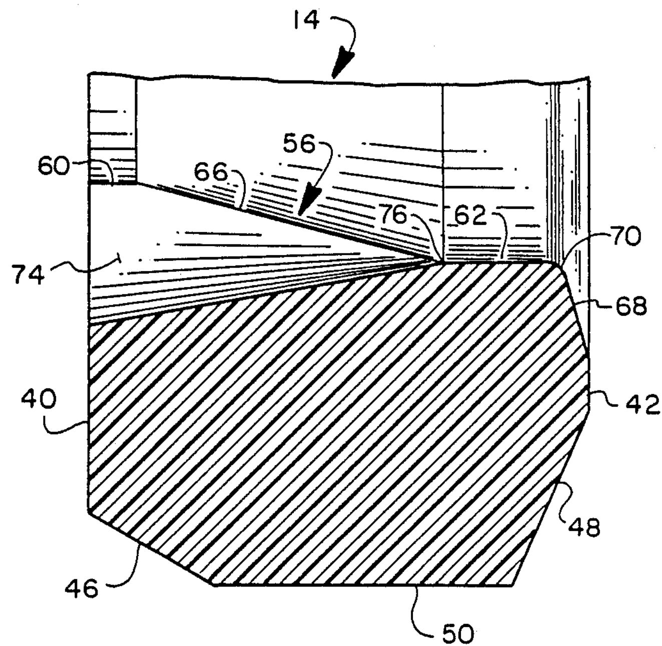
FIG. 8 is a fragmentary cross-sectional view of the gasket of FIG. 7.

Referring to the fragmentary cross-sectional view of FIG. 8, it can be easily seen that gasket 14 has outer and inner chamfered corners 46, 48, respectively located on either end of a generally cylindrical outer wall 50.

Gasket 14 has a hollow center 54 for receiving portions of the valve stem 12. The hollow center 54 is defined by a bore wall of the gasket, generally indicated at 56. Bore wall 56 has a number of unique features which provide an improved mounting and sealing capability, as will be seen herein. The bore wall 56 includes generally cylindrical outer and inner wall portions 60, 62 disposed on either side of an inwardly diverging transition wall section 66 which diverges in a direction toward the inner 42 end of gasket 14. In the preferred embodiment, the wall section 66 is tapered to assume a frustoconical shape. As will be seen herein, wall 66 can have other diverging configurations, such as the concave annular configuration illustrated in FIG. 12. The bore wall 56 further includes a diverging outer end portion 68 which opens toward the inner flange of the valve stem (assuming a completed valve configuration). End portion 68 is preferably tapered, but can be concave or convex, if desired. A relatively small radius portion 70 blends the cylindrical end portion 62 and outer diverging portions 68 of the bore wall.

Referring again to FIGS. 7 and 8, gasket 14 has at least one recess, and, in its preferred embodiment, includes four equally spaced partial recesses 74. The recesses 74 preferably have a tapered configuration, opening toward the outer end of the gasket to facilitate cleaning and inspection. In the preferred embodiment, recesses 74 are part conical in configuration, terminating at their inner end at a rounded tip 76. It should be noted that the tip 76 is spaced from the inner end 42 of the gasket.

Referring again to FIG. 8, a cross-sectional view taken through the deepest portion of recess 74, it can be seen that the recess has a relatively small size compared to the outer annular surface 40 of gasket 14. Accordingly, the flexibility of the gasket, particularly when placed under a hoop stress is not significantly altered by the recesses 74. As will be seen shortly, the gasket is installed by pressing the outer flange of the valve stem through the gasket bore. This installation procedure subjects the outer end of the gasket to hoop stresses, which tend to radially outwardly expand the central bore at the outer end of the gasket. According to one aspect of the present invention, the expansion is localized at the outer end of the gasket, the inner end of the gasket remaining unstretched. As will be seen herein, the configuration of the gasket bore wall plays an important role in the gasket installation procedure, providing an easy, rapid insertion of the gasket.

Figure 9:
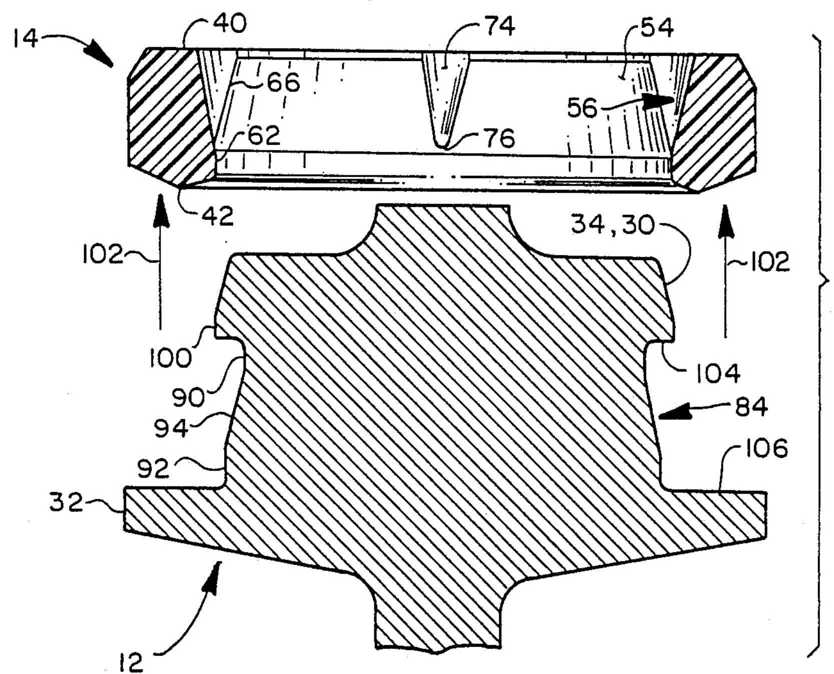
FIG. 9 is a fragmentary exploded cross-sectional view showing assembly of the valve stem and gasket components of the valve stem assembly of FIG. 1.
Figure 10:
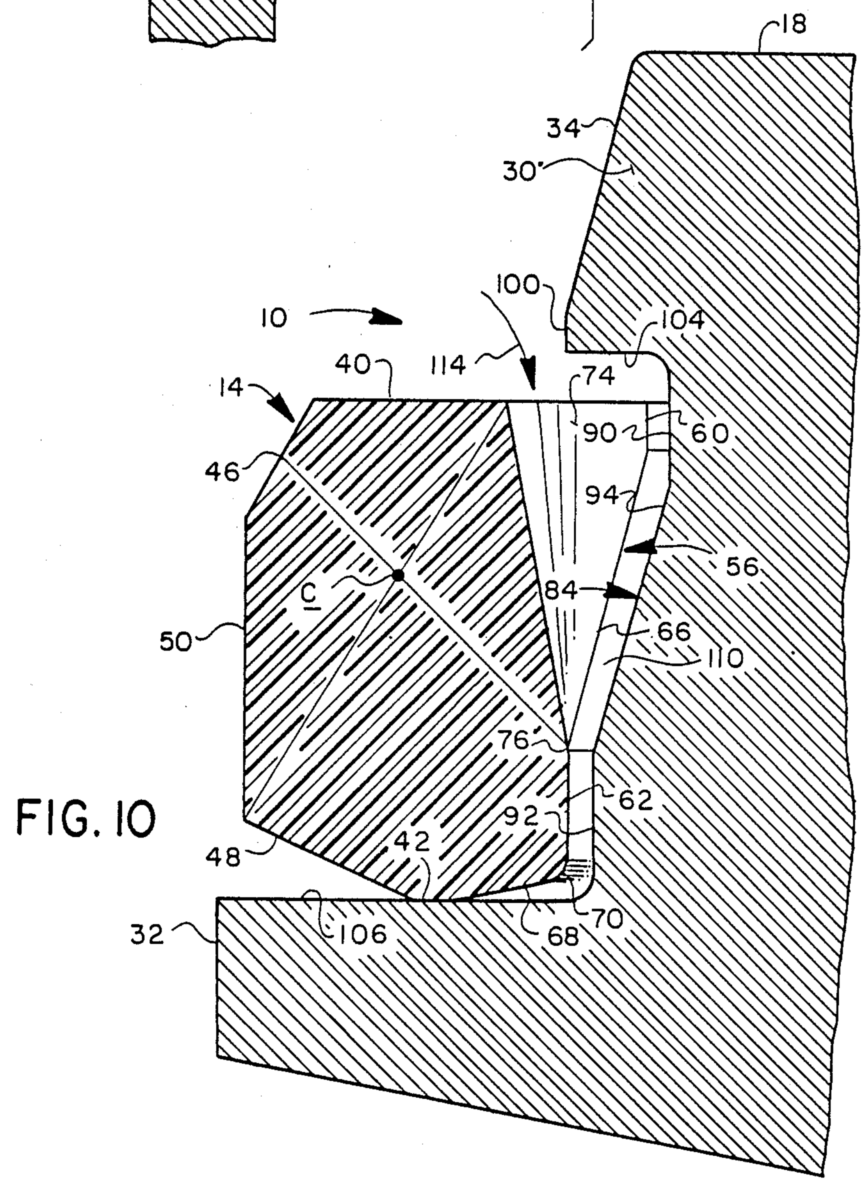
FIG. 10 is a fragmentary cross-sectional view showing the left-hand portion of FIG. 9 on an enlarged scale, with the valve components in a fully assembled condition.

Referring now to FIGS. 9 and 10, the valve stem 12 includes a central portion generally indicated at 84, disposed between the outer and inner flanges 30, 32. The central portion 84 includes outer and inner generally cylindrical end portions 90, 92, respectively and an intermediate tapered portion 94 converging toward the outer end of the valve stem. It will thus be seen that the outer configuration of central portion 84 complements the configuration of the bore wall 56 of gasket 14.

As can be seen from FIG. 9, the internal bore 54 of gasket 14 is dimensioned to receive the peripheral edge 34 of outer flange 30. In the preferred embodiment, the largest diameter portion of gasket bore 54 is located at the inner cylindrical section 62 of bore wall 56. The diameter of section 62 is preferably dimensioned approximately equal to the diameter of the cylindrical end portion 100 of the outer flange peripheral edge surface 34. This provides a substantial seating engagement of the gasket about the outer end of the valve stem and, owing to the tapered surface of the outer flange periphery the gasket is easily centered about the valve stem.

Using a cylindrical installation tool, such as a conventional clamp ferrule (not shown in the drawings) gasket 14 is held in place on a work surface or the like. The outer end of the valve stem is then located in the bore of gasket 14, with the outer surface 34 of the valve stem free end nested within the gasket bore wall section 62. Thus, a preliminary alignment is conveniently provided by the valve stem assembly according to the present invention. Further, the alignment is self-orienting, due to the configuration of the gasket bore wall and the valve stem free end periphery. This simplifies the installation procedure considerably, freeing an operator's attention to the next step in the assembly, pressing the valve stem outer flange through the gasket.

Using a mallet, press or other suitable means, an operator applies force to the valve stem in the axial direction of arrows 102, shown on FIG. 9. This brings the tapered peripheral surface 34 of outer flange 30 in contact with the transition section 66 of the gasket bore wall 56. As mentioned the same configuration is provided to both the wall section 66 and the peripheral surface 34. With the application of force in the direction of arrows 102, the tapered outer periphery 34 of outer flange 30 works against the bore wall section 66, causing the outer end of gasket 14 to outwardly swell, or "roll" as the valve stem outer flange passes the transition wall 66. Referring to the cross-sectional view of FIG. 10, the gasket rotates about centroid C of the cross-section, with the inner end of the gasket remaining unexpanded. Thus, any bore-enlarging hoop stresses are imparted only to the outer end of gasket 14.

With continued application of force the gasket is passed completely beyond the outer flange 30 and is free to roll in a reverse direction, resuming the initial, smaller diameter size at its outer end, so as to be held captive between the flanges 30, 32. More specifically, when the outer surface 40 of gasket 14 butts against the internal surface 104 of outer flange 30 the inner, seating surface 42 is free to move toward the seating surface 106 of inner flange 32. With the present invention, a more efficient use is made of a materials memory characteristics, it being easier for an annular gasket to overcome the aforedescribed "rolling" deformation than for a simple swelling hoop stress deformation.

Referring to FIG. 10, the valve assembly 10 is shown in its fully assembled condition, with the gasket 14 when centered about the axis of valve stem 12. Thus, the spacing or gap 110 between gasket 14 and valve stem 12 which is illustrated in the fragmentary cross-sectional view of FIG. 10 is also present throughout other portions of the valve stem and gasket. As can be seen in FIG. 10, an ample spacing is provided between the gasket and valve stem for cleaning of the valve assembly using a flow of cleaning fluid. For example, a flow is applied to the valve assembly in the general direction of arrow 114. The flow passes between the opposing surfaces 40, 104 of the gasket and valve stem outer flange as the valve is cycled.

The flow passes between the cylindrical end sections 60, 90 of the gasket bore wall 56 and valve stem central portion 84, respectively. Flow also passes through the recesses 74, being "funneled" to the mating surfaces 66, 94 of the gasket bore wall and valve stem central section. The flow enters the gap between the opposed surfaces 62, 92 of the gasket and valve stem, passing between the diverging portion 68 of the gasket inner end and the radially interior portion of valve stem surface 106. The gasket 14 was observed to lift or bobble during flush cleaning tests, thus confirming that the "hidden" or interior surfaces of the gasket and valve stem are accessible to cleaning fluid during a flush operation.

When the valve is in a closed position, the bevelled corner 46 of gasket 14 is placed in contact with the seating surface 220 of the valve housing 210, producing a force component extending generally toward the small radius transition 70 positioned intermediate the surfaces 62, 68 of the gasket bore wall. The sealing surface 42 is shifted somewhat in a radially inward direction from the mid-radial position of gasket 14, toward the bore wall 56. Also, the seating surface 42 has a substantial radial width, located between tapered surfaces 48, 68, a configuration providing an improved sealing engagement with the surface 106 of inner flange 32.

Figure 4:
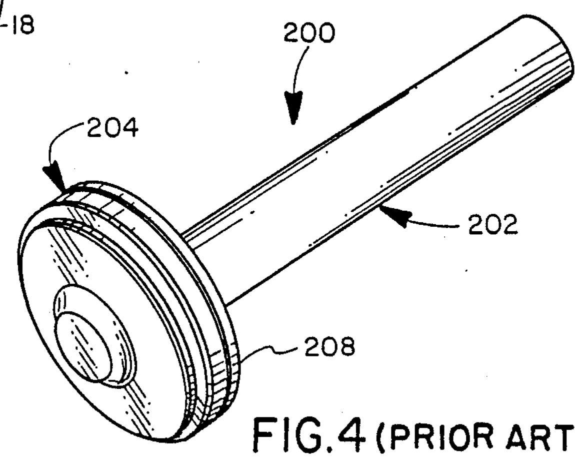
FIG. 4 is a perspective view of a prior art valve assembly.
Figure 5:
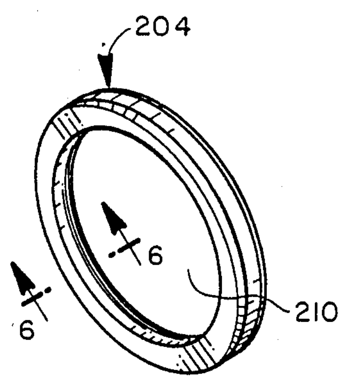
FIG. 5 is a perspective view of a gasket of the valve assembly of FIG. 4.
Figure 6:
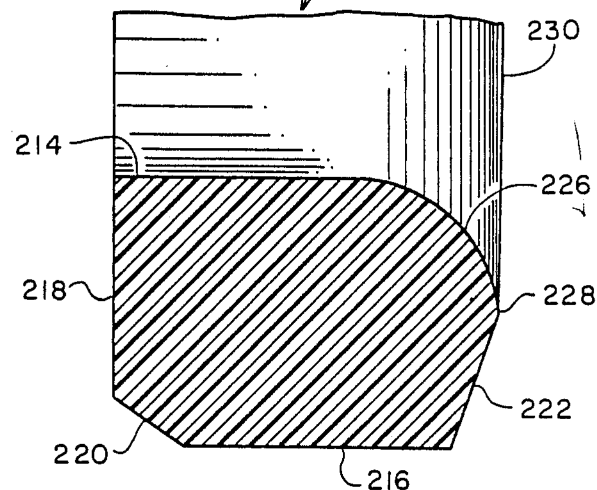
FIG. 6 is a fragmentary cross-sectional view taken along the lines 6—6 of FIG. 5.

With reference to FIGS. 4–6, a prior art valve assembly by the assignee of the present invention is shown for comparison purposes. The valve stem assembly is generally indicated at 200 and includes a valve stem generally indicated at 202 and a gasket generally indicated at 204. The valve stem includes an outer flange 206 and an inner flange 208. The gasket 204 when mounted in valve stem 202 has both radial and axial "play", useful for an effective flush cleaning of the interior "hidden" surfaces of the gasket and valve stem.

Gasket 204 is illustrated in FIG. 5, and as can be seen, has a generally cylindrical configuration with unbroken external surfaces. The internal bore 210 of gasket 204 is enlarged by heating the gasket 204 to a required temperature. With the application of considerable pressure, the gasket 204 is worked over the outer flange 206 becoming trapped between flanges 206, 208.

Referring to FIG. 6, gasket 204 has a cross-section somewhat resembling a modified rectangle. That is, the bore wall 214 defining the inner bore of the gasket is generally parallel to the cylindrical outer surface 216, and the bore wall 214 is formed at a generally right angle to the outer surface 218 of the cylindrical gasket body. The gasket cross-section departs from a true rectangle in that the outer corners 220, 222 are bevelled or tapered, and the inner portion 226 of bore wall 214 is rounded with a relatively large radius, meeting the inner bevelled corner 222 at a point 228 on the circular seating line 230 at the inner end of the gasket.

In contrast to the gasket 14 of the present invention, the prior art gasket 204 has a circle or line contact at its seating surface as opposed to the annular seating surface 42 of the present invention. If an excessive pressure is applied to the outer bevelled corner 220, the radius surface 226 of the gasket may tend to "roll" against the valve stem flange, still providing a circle or line of contact as opposed to a broadened annulus of contact as in the present invention.

Further, unlike many prior art gasket designs, such as the generally cylindrical bore wall 214, the bore wall transition section 66 of the present invention has a diverging configuration which provides increased retention against blowout of the gasket under a high pressure flushing operation.

Several advantages are attained during assembly of the valve. For example, the camming action possible with the tapered surface 66 makes it possible to rotate the gasket about centroid C, applying a controlled stretching force which is localized at the outer end of the gasket, thus reducing tensile strain imparted to the gasket material during installation. Further, the cylindrical inner portion 62 of the bore wall 56 provides an improved centering and an improved, more stable "setup" of the gasket on the valve stem flange prior to application of insertion force to the valve stem which works the gasket past the valve stem outer flange.

According to one important aspect of the present invention, these several features and advantages are provided with a minimal disturbance to a smooth, continuous outer surface of the gasket and valve stem, the surfaces being interrupted only over relatively small surface portions to provide visual inspection and improved turbulent flow cleansing of the valve assembly. Further, the recesses employed in the present invention enable the gasket to be readily cleaned with moderately turbulent flow.

Figure 12:
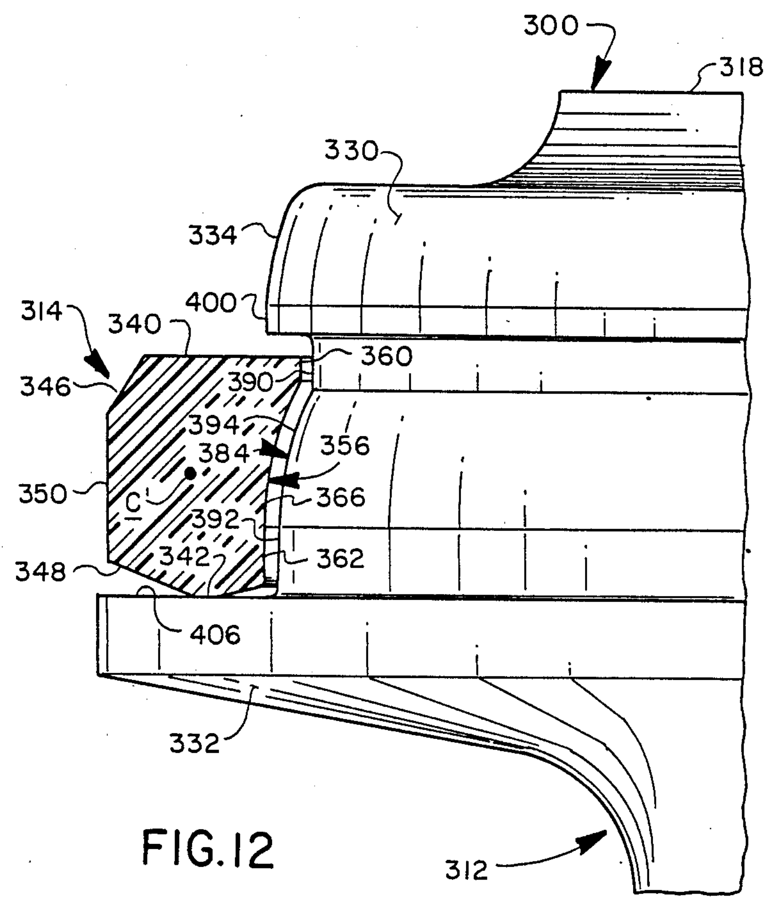
FIG. 12 is a fragmentary cross-sectional view of another valve stem and gasket assembly illustrating principles of the present invention.

Referring to FIG. 12, an alternative embodiment of a valve stem and gasket assembly is generally indicated at 300. The valve stem and gasket assembly 300 is similar in many respects to the aforementioned valve stem and gasket assembly 100. For example, the valve stem 312 has an outer flange 330 with an outwardly converging periphery 334 and a cylindrical shoulder 400, similar to valve stem 12. Further, the valve stem 300 has an inner flange 332 similar to the flange 32 of assembly 10. The valve stem 312 further has a body portion with an outer surface generally indicated at 384, having inner and outer end portions 392, 390, respectively. As with the valve stem 12, the valve stem 312 of FIG. 12 has a transition or mid portion 394 which is inwardly diverging, that is, expanding in the inward direction facing toward inner flange 332. Expressed another way, the mid portion 394 of the valve body surface 384 converges in a direction toward the outer flange 330.

However, unlike the tapered outer flange periphery 34 of valve stem 12, the outer flange periphery 334 of valve stem 312 has a rounded convex configuration. In cross section, the outer flange periphery is parabolic, but can also be part circular, hyperbolic or may have other rounded shapes which are outwardly converging.

Also, unlike the body surface portion 94 of assembly 10, the valve stem 312 differs in that its diverging mid portion 394 is not tapered so as to form a frustoconical configuration, but rather is curved. The curved mid portion 394 may be radiused, forming a portion of a circle when viewed in cross-section, or may take on other curved shapes such as that of a parabola or a hyperbola. As with the valve stem 12, valve stem 312 has end portions 390, 392 adjacent the gasket, which are generally cylindrical. As can be seen in the figures, valve stem 312 is similar in other respects to the valve stem 12 described above.

Assembly 300 further includes a gasket generally indicated at 314 having many of the same features as gasket 14 described above. For example, gasket 314 has inner and outer opposed annular faces 342, 340, respectively. Gasket 314 further includes bevelled corners 346, 348 and an intervening cylindrical outer peripheral surface 350. Further, gasket 314 has an inner bore wall 356 having outside and inside generally cylindrical end portions 360, 362, respectively. Intermediate the end portions is a transition surface portion 366.

Gasket 314 is distinguished from gasket 14 described above, principally by the configuration of the transition wall surface portion 366. Surface 366 is concave, diverging in an outer direction, opening toward the outer flange 332 of the valve stem. Surface 366, unlike the bevelled surface 66 of gasket 14, is curved. In the preferred construction of this alternative embodiment, the curve of surface portion 366 forms in cross-section, a portion of a circle. However, the surface 366 in cross-section could also comprise a portion of a parabola, an hyperbola, or another curved configuration.

Once gasket 314 is supported by a clamping ferrule, and the outer end 318 of valve stem 312 is inserted in the gasket bore, the peripheral surface 344 of the outer valve stem flange 330 is received in the gasket inner bore, with peripheral surface 400 of the outer flange position adjacent the end surface portion 362 of gasket 314.

With the application of an axial force applied to valve stem 312, the valve stem outer flange 330 is worked past the transition surface portion 366 and end portion 360 of the gasket bore wall, causing the gasket cross-section to rotate about its centroid C. Thus, the valve stem and gasket assembly 300 attains the advantages described above with reference to the assembly 10.

Figure 13:
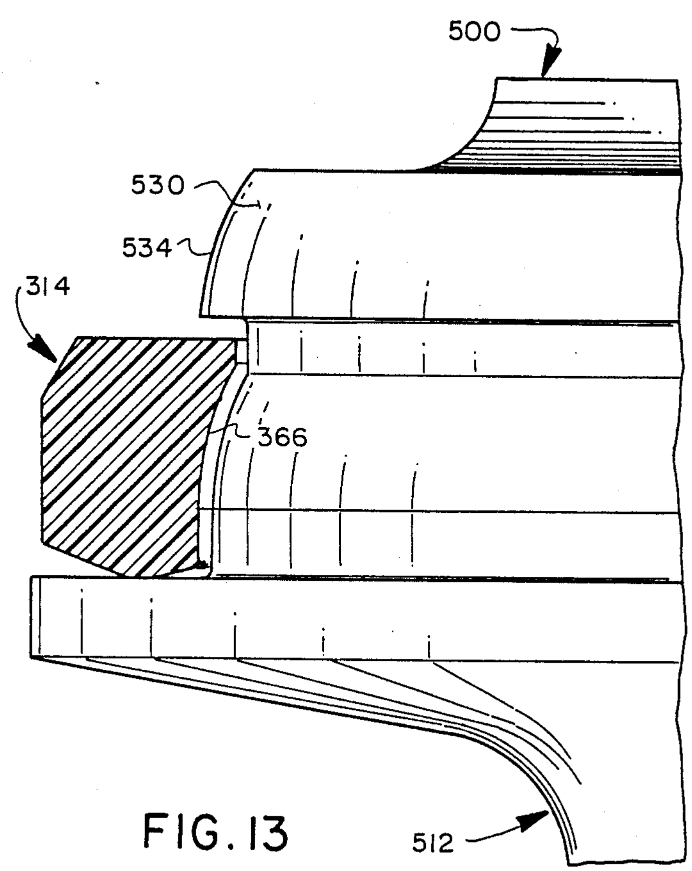
FIG. 13 is an elevational view of another alternative embodiment of valve stem and gasket assembly illustrating principles according to the present invention.

Referring now to FIG. 13, a valve stem and gasket assembly is generally indicated at 500. The gasket employed in assembly 500 is identical to the gasket 314 of FIG. 12, and accordingly bears the same reference numeral. The valve stem indicated at 512 is substantially identical to the valve stem 312, except that the exterior surface 534 of the outer valve stem flange 530 is not parabolic, but rather is part circular so as to complement the rounded bore wall portion 366 of gasket 314.

However, according to one aspect of the present invention, while it is preferred that the shapes of surfaces 534, 366 complement one another, the curve surface 534 can form a portion of a parabola (as in FIG. 12), an hyperbola or another curved configuration and need not be identically complementary to that of the bore wall portion 366 of gasket 314. Thus, as can be seen by comparing FIGS. 12 and 13, the same gasket 314 can be installed over a valve stem outer flange having a variety of rounded configurations. One advantage of the curved outer flange periphery 534 is that, when it is made to complement the bore wall surface portion 366 of gasket 314, friction between the gasket bore wall and the valve stem peripheral surface is greatly reduced, further aiding in the ease of insertion of the valve stem outer flange past the gasket bore wall.

As can be seen from the above, one principle according to the present invention, is to provide a valve stem outer flange having a peripheral surface either roughly complementing the gasket bore wall (as illustrated in FIG. 10) or more closely complementing the bore wall of the gasket (as illustrated in FIGS. 10 and 13, for example). As used herein, the term "roughly complementing" implies that the gasket bore wall and valve stem outer flange peripheral surface both diverge (or conversely converge) in the same direction, thus causing the gasket cross-section to rotate about its cross-sectional centroid. One example is given by a tapered, frustoconical outer flange used with a rounded gasket bore wall. Such, however is not preferred due to the increased friction during installation.

Optionally, the valve stem outer surface (that located opposite the gasket bore wall) can have similar, complementary configuration to the gasket bore wall. This has been found to provide a number of advantages, including improved retention of the gasket on the valve stem leading to a higher resistance to "blow out" where the gasket is demounted from the valve stem during certain types of turbulent flushing operations.

Figure 14:
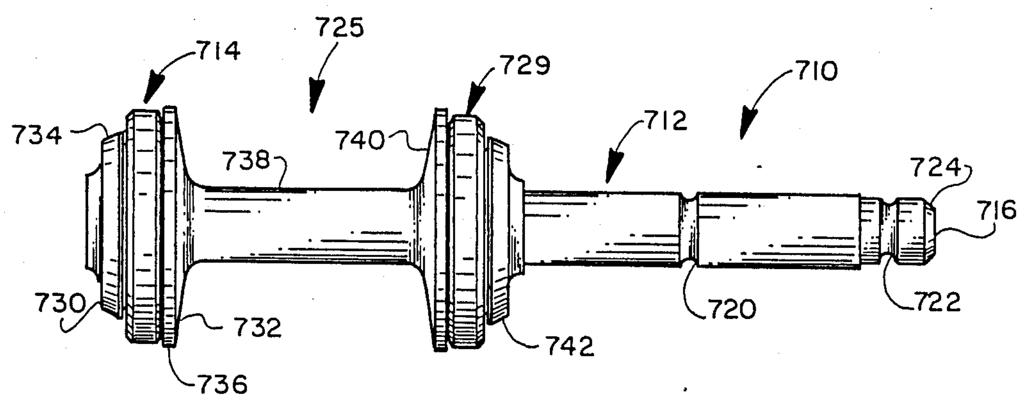
FIG. 14 is an elevational view of an alternative valve assembly illustrating principles according to the present invention.

Various alternative embodiments of valve stem and gasket assemblies according to principles of the present invention have been illustrated for use with "shut-off" valve mechanisms. It should be expressly understood, however, that the present invention can also be applied to other types of valve mechanisms, such as a divert valve mechanism. Referring now to FIG. 14, a valve stem and gasket assembly for use in a divert valve is generally indicated at 710 Assembly 710 includes a valve stem generally indicated at 712 having an inner end 716 with a recess 722 and chamfered edge 724 for a coupling of the valve stem to an actuator. The outer free end of the valve stem is generally indicated at 725 which includes provisions for mounting a first gasket 714 and a second gasket 730.

Valve stem 712 includes outer and inner spaced flanges 730, 732 receiving therebetween the gasket 714. These flanges 730, 732 and gasket 714 are identical to the related structure described with reference to FIG. 2. An intermediate valve stem portion 738 separates aforementioned flanges and gasket 714 from a second, identical set of flanges holding the gasket 729 captive therebetween. Outer and inner flanges 740, 742 are disposed on either side of gasket 729 and are preferably identical in configuration and operation to the flanges and gasket of assembly 10 illustrated in FIG. 2, being a mirror image of the flanges 730, 732 and the gasket 714 appearing at the outer most end of valve stem 712. Each pair of flanges and each gasket of the assembly 710 are identical to the corresponding arrangement of assembly 10, in construction and function.

The divert valve arrangement of assembly 10 allows closing of a first flow circuit with the simultaneous opening of a second flow circuit. Upon energizing of the actuator, the first flow circuit can be opened while the second flow circuit is simultaneous closed. Alternatively, the actuator can be operated to move the assembly 710 to an intermediate position where both flow circuits are opened. This is one example of a wide range of applications that can be benefited by the present invention.

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated by the following claims.

What is claimed is:

1. A valve stem and gasket assembly, comprising:

a valve stem having a body having an inner end for connection to an actuator and an opposed outer end portion having a free end;

a first, smaller flange carried on said body adjacent the outer end, having an outer peripheral wall and a spaced apart second, larger flange also carried on said body, between said first flange and said body inner end;

an annular gasket carried on said body, between said first and second flanges, said gasket made of a resilient material and having a bore wall defining a central opening so as to be mountable on said valve stem by passing the first flange through the central opening thereof with the gasket thereupon being held captive between said first and second flanges;

said first flange having an outer periphery for contacting said gasket bore wall during mounting of said gasket on said valve stem, said outer periphery being formed so as to converge toward said body outer end;

at least a portion of said gasket bore wall extending between first, outer and second, inner continuous annular faces of said gasket disposed adjacent said first and second flanges when said gasket is mounted on said valve stem;

said gasket bore wall converging toward said outer face of said gasket, with said outer face abutting said outer flange when said gasket is mounted on said valve stem; and said gasket inner and outer faces spaced apart by a distance less than the spacing between said valve stem inner and outer flanges so as to allow movement of said gasket between said inner and outer flanges.

2. The assembly of claim 1 wherein the outer peripheral wall of said outer flange diverges toward said gasket.

3. The assembly of claim 2 wherein said outer flange outer peripheral wall has a frustoconical taper.

4. The assembly of claim 3 wherein said gasket bore wall portion has a frustoconical taper, opening toward said gasket outer face.

5. The assembly of claim 3 wherein said gasket bore wall portion is concave so as to have a curved cross-section.

6. The assembly of claim 2 wherein said outer flange outer peripheral wall is convex, having a curved cross-section.

7. The assembly of claim 1 wherein said gasket bore wall portion has a preselected configuration complementing that of the outer flange outer peripheral wall.

8. The assembly of claim 7 wherein said gasket bore wall portion has a frustoconical taper, opening toward said gasket outer face.

9. The assembly of claim 7 wherein said gasket bore wall portion is concave so as to have a curved cross-section.

10. The assembly of claim 1 wherein said gasket bore wall includes larger and smaller diameter inner and outer cylindrical end portions, respectively, one on either side of said gasket bore wall portion.

11. The assembly of claim 1 wherein said gasket bore wall is spaced from said valve stem body to form a flow passageway for cleaning fluid between said valve stem body and said gasket, said outer flange outer periphery defining at least one recess for flow of cleaning fluid past said flange into said passageway.

12. The assembly of claim 11 further comprising at least one recess formed in said gasket bore wall communicating with said outer flange recess for visual inspection of said inner flange when viewing said assembly from the valve body outer end.

13. The assembly of claim 12 wherein said gasket bore wall recess is spaced from said gasket inner face.

14. The assembly of claim 13 wherein said gasket bore wall includes a diverging portion extending from said gasket inner face.

15. The assembly of claim 14 wherein said gasket bore wall includes a cylindrical portion between said gasket recess and said gasket inner face dimensioned to receive said valve stem outer flange with a close fit so as to align said gasket tapered portion with said valve stem outer flange preparatory to forcing said gasket past said outer flange.

16. The assembly of claim 14 wherein the portion of said valve stem body between said inner and outer flanges has a cross-sectional configuration complementing that of the gasket bore wall.

17. The assembly of claim 14 wherein the portion of said valve stem body between said inner and outer flanges includes a generally cylindrical inner section adjacent the inner flange, a generally cylindrical outer section adjacent the outer flange, and an intermediate section therebetween converging toward said outer flange.

18. The assembly of claim 12 wherein said valve stem outer flange defines two equally spaced recesses therein.

19. The assembly of claim 12 wherein said gasket bore wall defines four equally spaced recesses therein.

20. The assembly of claim 1 further comprising another gasket retaining portion including a pair of spaced apart flanges with another gasket therebetween, the other gasket retaining portion located between said inner flange and said inner valve stem end.

21. The valve stem of claim 20 wherein said valve stem outer flange defines two equally spaced recesses therein.

22. A gasket for mounting between spaced apart flanges of a valve stem, so as to accommodate a flow of washing fluid between the gasket and valve stem, comprising:

a generally cylindrical body of a resilient material;

a bore wall defining a central opening so as to be mountable on said valve stem by passing an end of the valve stem therethrough;

first, outer and second, inner continuous annular faces spaced apart from one another on opposite sides of said body;

said gasket bore wall extending between said first, outer and second, inner faces of said gasket, and converging toward said outer face; and said cylindrical body having a pair of outside bevelled corners adjacent said first, outer and second, inner faces, said bevelled corner adjacent said second inner face being larger so that said inner face has a smaller diameter than said outer face.

23. A valve stem and gasket assembly, comprising:

a valve stem having a body having an inner end for connection to an actuator and an opposed outer end portion having a free end;

a first, smaller flange carried on said body adjacent the outer end, having an outer peripheral wall converging toward said outer free end and a spaced apart second, larger flange also carried on said body, between said first flange and said body inner end;

an annular gasket carried on said body, between said first and second flanges, said gasket made of a resilient material and having a bore wall defining a central opening converging toward said outer free end so as to be mountable on said valve stem by passing the first flange through the central opening thereof with the gasket thereupon being held captive between said first and second flanges;

said first flange having an outer periphery for contacting said gasket bore wall during mounting of said gasket on said valve stem, said outer periphery being formed so as to converge toward said body outer end;

at least a portion of said gasket bore wall extending between first, outer and second, inner continuous annular faces of said gasket disposed adjacent said first and second flanges when said gasket is mounted on said valve stem;

said gasket bore wall converging toward said outer face of said gasket, with said outer face abutting said outer flange when said gasket is mounted on said valve stem; and said gasket inner and outer faces spaced apart by a distance less than the spacing between said valve stem inner and outer flanges so as to allow movement of said gasket between said inner and outer flanges.

24. The assembly of claim 23 wherein said gasket bore wall portion has a preselected configuration complementing that of the outer flange outer peripheral wall.

25. The assembly of claim 23 further comprising another gasket retaining portion including a pair of spaced apart flanges with another gasket therebetween, the other gasket retaining portion located between said inner flange and said inner valve stem end.

* * * * *